Figure 2:
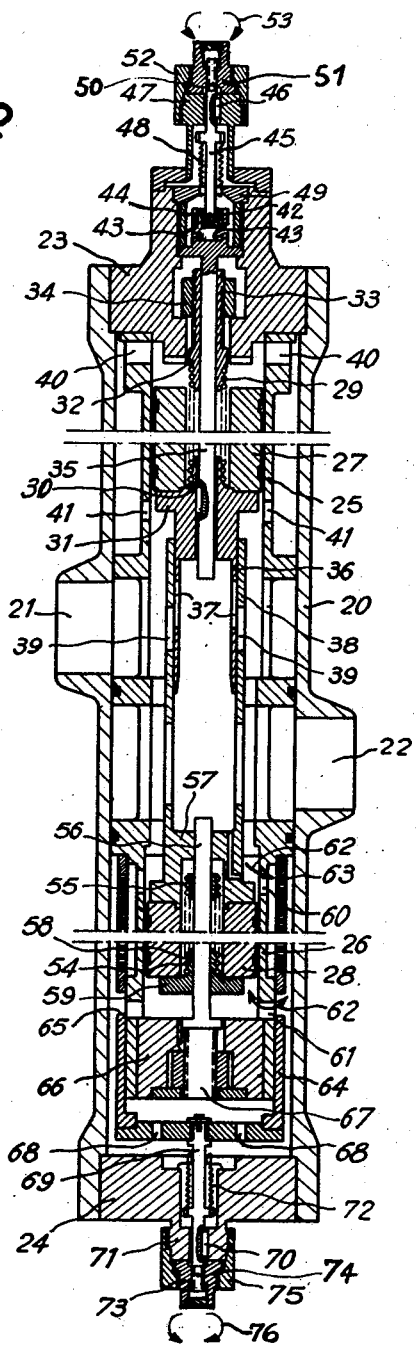

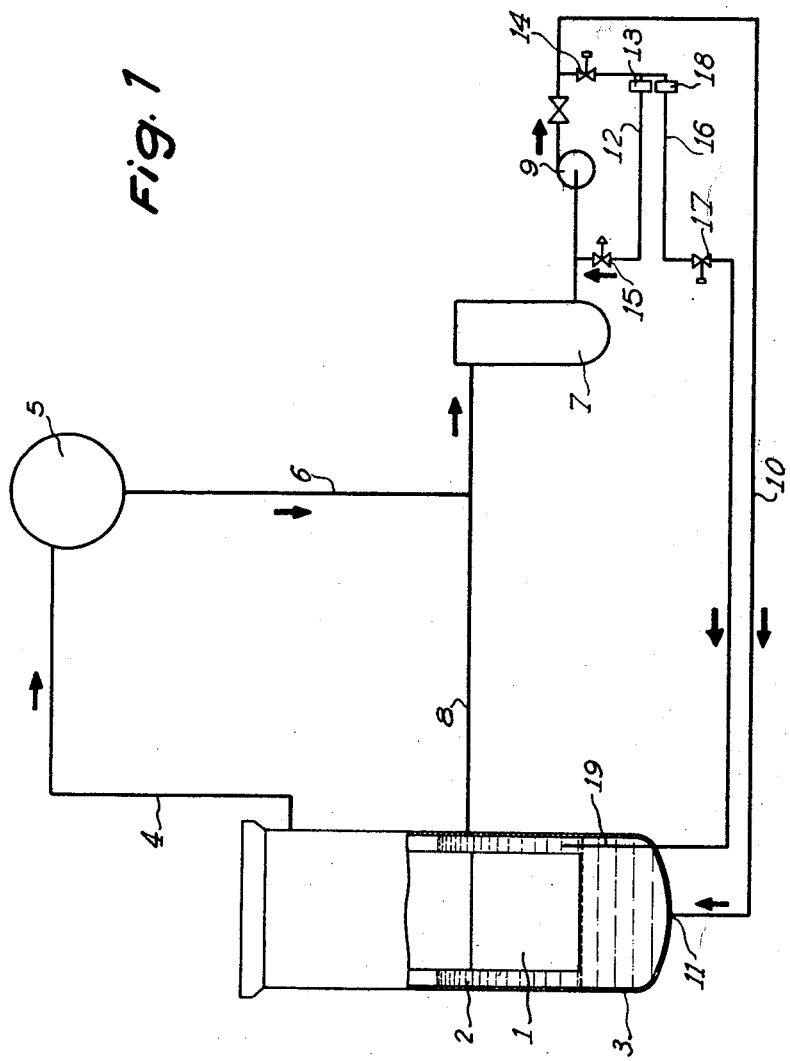

United States Patent Office 3,152,047
Patented Oct. 6, 1964

3,152,047
LIQUID MODERATED NUCLEAR REACTORS SUBJECT TO VARYING MOVEMENTS
Pierre-Jean Ricard, Paris, Alfred Georges Jean Hirtz, Boulogne, and Michel Clayer, Aulnay-sous-Bois, France, assignors to Commissariat a l'Energie Atomique, Paris, France
Filed Aug. 17, 1959, Ser. No. 834,160
Claims priority, application France, Aug. 22, 1958, 772,942
7 Claims. (Cl. 176—20)

The invention is concerned with improvements in or relating to nuclear reactors and more particularly liquid moderated reactors subject to varying movements.

Using a reactor with a boiling liquid, for example water, on a moving machine, such as a ship or otherwise, presents problems caused by the effect on the density of the moderator fluid exerted by movements of the whole; the reactivity and stability of the reactor are affected thereby.

The density of the moderator depends on the relative speed of steam bubbles inside the liquid with respect to the liquid; it is a decreasing function of pressure, and an increasing function of steam content.

Moreover, if water containing steam bubbles in suspension is accelerated, it is as if the specific weights of the water and steam were varying. This results in a variation in the relative speed of the bubbles, and consequently in the density of the water-steam mixture. It is particularly notable that vertical acceleration causes the largest variations in moderator density in a reactor installed on board ship.

The object of the present invention is to reduce irregularities in the operation of a reactor, such irregularities being due to movements imparted to an assembly consisting of, for example: a liquid-moderated reactor, one or more heat-exchangers wherein the moderator liquid flows from the moderation zone as far as the inlet to the exchangers, and subsequently from the outlet of the exchangers back to the reactor (recycling).

According to the present invention there is provided a nuclear reactor including a circuit for circulating liquid moderator from the reactor vessel through means for utilising the energy acquired by the moderator in the reactor vessel and back to the vessel, the circuit including flow control means adapted to regulate the delivery of the moderator to the reactor vessel as a function of acceleration of the reactor upon movement of the reactor, to reduce variation of the density of the liquid in the vessel consequent upon such acceleration, the flow control in operation increasing the delivery upon reduction of density and reducing the delivery upon increase of density.

The reactor may be constructed in various ways, and in particular as a vertical reactor fitted on board ship, wherein the variations in delivery compensate for variations in the density of the liquid caused by vertical acceleration. In this particular case, an upward movement is imparted to the liquid delivered to the reactor.

In the most general case, the liquid, after passing into one or more heat-exchangers, is re-introduced into the lower part of the reactor, outside the moderation zone.

According to a preferred feature of the invention, some of the recycled liquid is introduced into the moderation zone, at a delivery which is regulated as a function of acceleration of the whole.

Although any suitable means may be used for regulating the delivery in accordance with the instantaneous density of the liquid in the moderation zone, in a preferred arrangement the regulation is effected by means of a mass which is displaceable under the effect of the said acceleration; movements of this mass are used in order to vary the flow cross-section offered to the liquid to be recycled. The said mass preferably moves inside the liquid itself.

According to how the exchanger or exchangers is or are arranged with respect to the reactor, and according to other features of the whole arrangement, the said means for varying the flow cross-section may be disposed between the reactor and the inlet to the exchanger, or between the outlet of the exchanger and the return to the reactor. If a pump of centrifugal type is used for circulating the liquid, the said means may be disposed on the outlet pipe of the pump.

In a preferred arrangement, the said means are fitted in a by-pass pipe connecting the inlet and outlet of the pump.

According to a further feature of the present invention there is provided a flow control valve for regulating flow of liquid as a function of the acceleration of the valve upon movement thereof, the valve comprising a first valve member defining a duct for liquid flow and a second valve member movable by a mass supported by the valve relative to the first valve member to vary the cross-section of the duct, the mass being located in a chamber in communication with the inlet to and the outlet from the duct.

In the remainder of the present description, the means for varying the flow cross-section offered to the liquid, which may comprise the flow control valve defined in the preceding paragraph, are designated by the expressions "compensating device" or "compensating appliance."

In order that the present invention may be well understood there will now be described an embodiment of liquid moderated nuclear reactor and of a compensating device for use therein given by way of example only, reference being had to the accompanying drawings in which:

FIGURE 1 is a diagrammatic view of a reactor vessel and associated heat-exchanger and secondary water reheater, and FIGURE 2 is a vertical section through a compensating appliance which may be used with the reactor illustrated in FIGURE 1.

FIGURE 1 illustrates a nuclear reactor comprising an active core 1, and a liquid reflector 2, both located in a container 3. The liquid may, for example, be water.

The water vapour given off from the reactor enters a duct 4 leading to a heat-exchanger 5, wherein the primary steam condenses at the same time as the secondary water vapourises. The condensed primary steam flows via a duct 6 to a scondary liquid reheater 7. This latter is also supplied with hot liquid from the reflector 2 via a duct 8 into which the duct 6 opens.

The primary water leaving the reheater 7 is aspirated by a circulating pump 9 which returns the water to the container 3 of the reactor via a duct 10. This latter leads to a point 11 at the bottom of the container 3. The water then passes through regulator nozzles into the active cells of the core 1.

The diagram in FIGURE 1 is given only by way of example, the invention being equally applicable to other diagrams, for example to that in which the cold condensed water returning from the heat-exchangers (or directly from the turbine if there is no exchanger) would mix with the circulating water before aspiration by the pump, without the interposition of a reheater for the circulating water.

The device which compensates for vertical acceleration acts by varying the delivery of water entering the container 3 and the active cells. The device comprises at least one compensating appliance which will be described later with reference to FIGURE 2. This appliance is controlled by one or more regulator masses which alter the opening of a by-pass between the inlet and outlet of the pump 9. In fact, it is especially advantageous to dispose the compensating appliance on a by-pass, rather than to dispose it on the main circuit itself; this avoids the use of a bulky and expensive appliance.

FIGURE 1 illustrates a by-pass 12 associated with the pump 9, equipped with a compensating appliance 13, the by-pass being capable of being isolated by valves 14 and 15.

A second by-pass 16 is provided between the valve 14 and the reflector 2 of the reactor. It comprises a valve 17 and a compensating appliance 18. The by-pass 16 leads to a duct 19 passing through the base of the container 3 to reach the zone of the reflector 2.

The operation of the compensating device to which the invention relates, which has just been briefly described, will be explained later, after the description of the compensating appliance illustrated in FIGURE 2.

The compensating appliance illustrated in FIGURE 2 may be used to fulfil the functions of the appliances designated by 13 and 18 in FIGURE 1.

It comprises a body 20 pierced with an inlet 21 and an outlet 22 for the liquid. The body 20 is closed at both ends by the plugs 23 and 24. Inside the body there are two cylinders 25 and 26 wherein the masses 27 and 28 move vertically.

The mass 27 will hereinafter be called the regulator mass, and the piece 28 will be called the damping mass.

The regulator mass 27 is elastically supported by a spring 29 which is attached on the one hand to a bush 30 fast with a shoulder 31, and on the other hand to a hollow rod 32 which is threaded in its upper portion 33 and held in position by nuts 34 bearing against the inside of the plug 23.

A rod 35 is keyed to the bush 30 which supports the regulator mass 27 by way of the shoulder 31. This shoulder 31 is itself fast with a slide-valve 36 pierced with apertures 37 which allow liquid to flow. The slide-valve 36 moves in a tube 38 which is also pierced with apertures 39 for the flow of liquid.

Orifices 40 and 41 are provided in the cylinder 25 in order to allow liquid to flow freely from one side to the other of the regulator mass 27, and thus to avoid any damping.

As may be seen in FIGURE 2, the apertures 37 are at a higher level than the apertures 39. It follows from this that when upward acceleration is imparted to the ship the apertures 37 move downwards towards the apertures 39 and the by-pass aperture is enlarged. The opposite phenomenon occurs when the vertical acceleration is downwardly directed.

The compensating appliance also comprises means for regulating the amplitude of variations in opening of the by-pass, that is to say the amplitude of variations in delivery flowing through the cross-sections common to the apertures 37 and 39.

In order to alter these common cross-sections, provision is made for the slide-valve 36 to be capable of being rotated with respect to the tube 38, which tangentially displaces the apertures 37 and 39, altering their common opening. In order to obtain this result, the upper end of the rod 35 is flared in the form of a cup 42 whereof the wall is pierced with oblique apertures 43 forming ramps in which are engaged the ends of a stud 44 carried by a rod 45 which can move vertically in a fixed piece 47, and is guided during such movement by a key 46.

A bellows 48 connects the rod 45 and a cover 49 closing the recess in which the ramps 43 and the stud 44 are disposed. In addition, the rod 45 terminates at its upper end in a threaded portion 50 with which is engaged a control nut 51 which can rotate, but which is prevented from moving axially by a cap 52 screwed to the fixed piece 47.

When the nut 51 is rotated in either of the directions represented by the arrows 53, which may be done by remote control, the threaded portion 50 rises or falls, and the stud 44 causes the rod 45 to rotate by virtue of the ramps 43. The slide-valve 36 therefore rotates in the slide-valve 38, and the amplitude of variations in opening of the by-pass is regulated by this means.

One of the difficulties encountered in compensating for vertical acceleration is due to the fact that the delay in establishing density is greater for a variation in delivery than for a variation in acceleration, and that this difference is also supplemented by that due to the inertia of the water in the flow circuit and the by-pass circuits. The compensating appliance must therefore be given a phase lead of the order of a fraction of a second.

In order to obtain this phase lead, the compensating appliance comprises a damping mass 28. The latter is attached to the external slide-valve 38. It is supported by a spring 54 attached to a piece 55 engaging with a rod 56, with respect to which a piece 57 fast with the slide-valve 38 can slide. The spring 54 is also attached to a piece 58 comprising a shoulder 59 against which the damping mass 28 bears. This latter is therefore elastically supported by the spring 54, and can move vertically under the effect of vertical acceleration.

In addition, the cylinder 26 is pierced with orifices 60 and 61 allowing the liquid to flow from one side to the other of the mass 28, that is to say allowing this mass to move. However, the path of the liquid, which is diagrammatically represented by an arrow 62, comprises a passage through a perforated wall 63 which throttles the said liquid. Vertical displacement of the mass 28 is therefore damped.

The liquid flowing through the by-pass thus has its delivery regulated, on the one hand by the apertures 37 in the internal slide-valve 36 controlled by the regulator mass 27, and on the other hand by the apertures 39 in the external slide-valve 38 controlled by the damping mass 28.

The flow aperture of the compensator therefore varies as a function of the movements of both slide-valves 36 and 38, the said movements being determined by masses whereof one, 27, is free and the other, 28, is damped; movement of the slide-valve 36 is not delayed, but on the contrary movement of the slide-valve 38 has a phase lag; however, since displacement of the damping mass acts in opposite fashion to displacement of the regulator mass in the same direction, combining the two movements gives the phase lead required for satisfactory compensation for vertical acceleration.

The compensating appliance also comprises means for adjusting the damping given by the mass 28. These means comprise a hood 64 which covers the external lower wall of the cylinder 26. The edge 65 of this hood can partially block the orifices 61 through which the liquid flows from one side to the other of the damping mass 28. If the hood 64 is lifted, greater damping is provided.

The lower end of the cylinder 26 is closed by a base 66 in which the lower portion 67 of the rod 56 is fixed. The hood 64 is pierced with orifices 68 in order to allow it to move. The hood 64 is fast with a control rod 69 which can only move axially because of a key 70 in a fixed piece 71 fast with the base 24. A bellows 72 provides a fluid-tight seal between the rod 69 and the base 24.

A nut 73 engaging with the threaded end of the rod 69 is used to control axial displacement of the rod 69. The nut 73 can only rotate, axial movement being prevented by a cap 75 screwed to the piece 71.

Rotation in one direction or the other, as represented by the arrows 76, causes the cap 64 to rise or fall and to adjust the damping, that is to say the amount by which opening is out of phase. The nut 73 may be rotated by remote control.

The compensating device illustrated in FIGURE 2 therefore enables vertical acceleration to be taken into account by controlling opening of a by-pass associated with the pump 9 (FIGURE 1), it being possible to adjust the amplitude and phase with which the appliance opens. In addition, the shape of the apertures must be adapted to the losses of charge in the circuits, in order to make the delivery vary sinusoidally.

If consideration is now given to the device for compensating for the effects of vertical acceleration which was described with reference to FIGURE 1, it will be seen that the said device comprises, in a preferred arrangement, two compensating appliances such as that illustrated in FIGURE 2; these are the appliances 13 and 18.

The compensating appliance 13 is disposed on the by-pass 12, which returns to the inlet side of the pump 9 a certain delivery taken off on the outlet side of the said pump.

The by-pass 12 therefore enables the delivery of water returned to the container 3 of the reactor to be reduced, for example when upward vertical acceleration is imparted to the ship. When downward acceleration is imparted to the ship, the delivery diverted by the by-pass 12 is reduced in consequence of the regulating masses.

The device comprises a second compensating appliance 18 disposed on a second by-pass 16 which diverts some of the liquid directly into the reflector 2 of the reactor 1. This second by-pass constitutes an improvement comprised in the invention, applicable to the diagram in FIGURE 1, wherein the primary water is cooled while passing through the secondary water reheater 7. In fact, if the first by-pass were on its own, operation of the compensator 13 would vary the delivery of primary water through the heat-exchanger 7, with a consequent variation in the temperature of the water entering the reactor. The effect of this variation on the density of the moderator would be added to that of the delivery, but with a delay of several seconds, representing the time taken between the reheater 7 and the inlet to the cells of the reactor. It follows from this that it would be impossible to obtain such satisfactory compensation.

The use of two by-passes gives two diverted deliveries, each of them being regulated by an appliance 13 or 18. The appliances 13 and 18 may be so adjusted that the apertures controlled by the regulating and damping masses keep the delivery of liquid entering the exchanger 7, and consequently also the temperature at which the water enters the reactor, substantially constant. The said delivery becomes constant when the variation in delivery flowing through the by-pass 16 is equal and opposite to the variation in delivery flowing through the duct 10. If the circuit, instead of comprising a reheater 7 as shown in FIGURE 1, comprises a simple device for mixing the main circulation delivery 8 and the constant delivery of cold water 6 returning from the exchanger 5 (or directly from the turbine), before the pump, the temperature at the inlet to the reactor would be constant.

The appliance which has been described enables oscillation in the neutron power of the reactor to be reduced to an extremely low value. Moreover, provision may be made for the valve 15 to serve not only for isolation, but also for remote regulation, in order that it may be adjusted to the value giving optimum compensation.

In calm weather, that is to say when vertical acceleration imparted to the ship is small, the valve 15 is closed, and the regulating and damping masses of the compensating appliances 13 and 18 may be locked in an open position, thus, for example, causing the reflector to be supplied in normal fashion with a delivery of the order of 1% of the total delivery.

In rough weather, the valve 15 is open and the compensators are brought into action. Their amplitude and phase are remotely regulated by the means which have been described, in order to reduce fluctuations in neutron power to a minimum.

The invention is naturally not limited to the method of embodiment which has just been described, and which could be modified in detail without departing from the scope of the claims. In particular, the two compensating appliances 13 and 18 could be combined in a single appliance.

What is claimed is:

1. In a liquid moderated nuclear reactor subject to varying movements, a reactor vessel, mobile supporting means for said vessel, means for utilising energy from the reactor, a circuit for circulating liquid moderator from the reactor vessel through said means for utilising the energy acquired by the moderator in the reactor vessel and back to said vessel, and flow control means in said circuit regulating the delivery of the moderator to said reactor vessel as a function of acceleration of the reactor upon movement thereof, said flow control means comprising a valve, a first valve member for said valve defining a duct for liquid flow, a second valve member for said valve, a mass moving said second valve member relative to said first valve member to vary the cross section of the duct, and a chamber in communication with the duct containing said mass.

2. A nuclear reactor as described in claim 1, wherein said mass is elastically supported by said valve.

3. A nuclear reactor as described in claim 1, wherein the duct is normal to the direction of travel of said mass relative to said valve.

4. In a nuclear reactor as described in claim 1, an aperture in said second valve member movable by said mass towards and away from a position in which said aperture registers with said duct.

5. A nuclear reactor as described in claim 1, including an aperture in said second valve member and means for moving said second valve member relative to said first valve member to vary the line of travel of said aperture relative to said duct and to vary the maximum degree of registration therebetween by movement of said mass.

6. A nuclear reactor as described in claim 5, in which said first valve member is tubular, an aperture in the wall of said first valve member, and in which said second valve member is tubular and slidably engages said first valve member, an aperture in the wall of said second valve member, said second valve member being movable axially to move said aperture therein towards and away from registration with said aperture of said first valve member and being angularly movable about the common axis of said valve members to vary the angular position of said aperture therein relative to that axis and to the angular position of said aperture of said first valve member relative to that axis.

7. A nuclear reactor as described in claim 1, in which said first valve member is movable in the same direction as said second valve member, a second mass for moving said first valve member supported in a second chamber in communication with said duct and means for obstructing the flow of liquid in said second chamber to damp movement of said second mass.

References Cited in the file of this patent

UNITED STATES PATENTS

| | | |
|---|---|---|
| 2,407,982 | Hanna et al. | Sept. 24, 1946 |
| 2,788,012 | Torre | Apr. 9, 1957 |
| 2,789,556 | Clark et al. | Apr. 23, 1957 |
| 2,861,033 | Treshow | Nov. 18, 1958 |
| 2,869,564 | Royer | Jan. 20, 1959 |
| 2,873,242 | Treshow | Feb. 10, 1959 |
| 2,946,339 | Fairchild et al. | July 26, 1960 |

FOREIGN PATENTS

| | | |
|---|---|---|
| 604,304 | Great Britain | July 1, 1948 |

OTHER REFERENCES

Harrer et al.: Proceedings on the International Conference on the Peaceful Uses of Atomic Energy, vol. 3 (Power Reactors), August 1955, pp. 250–262.

ASAE-18, "Ship Design Trend Survey for the Atomic Energy Commission Maritime Reactors Branch," June 1957, page 20.

ANL-5607, "BWR," June 1957, pages 160-172.

Du Colombier et al.: Proceedings of the Second United Nations International Conference on the Peaceful Uses of Atomic Energy, vol. 8 (Nuclear Power Plants, Part I), September 1958, pages 143-166.

GEAP-3567, "Effects of Vertical Gravity Oscillations on Performance of the T7 Natural Circulation Boiling Water Reactor," June 14, 1961.